US006073233A

United States Patent [19]

Chapman

[11] Patent Number: 6,073,233

[45] Date of Patent: Jun. 6, 2000

[54] METHOD AND APPARATUS FOR DISTRIBUTING AND ACCESSING CONFIGURATION REGISTERS

[75] Inventor: John T. Chapman, Cupertino, Calif.

[73] Assignee: Cisco Technology, Inc., San Jose, Calif.

[21] Appl. No.: 08/947,009

[22] Filed: Oct. 8, 1997

[51] Int. Cl.[7] .......... G06F 9/00

[52] U.S. Cl. .......... 713/1; 708/200; 712/1

[58] Field of Search .......... 713/1, 300; 708/200; 712/1; 379/284

[56] References Cited

U.S. PATENT DOCUMENTS

| | | | |
|---|---|---|---|
| 4,807,282 | 2/1989 | Kazan et al. | 379/284 |
| 4,922,846 | 5/1990 | Lidinsky et al. . | |
| 5,561,821 | 10/1996 | Gephardt et al. | 395/848 |
| 5,606,713 | 2/1997 | Wisor et al. | 395/800 |
| 5,630,171 | 5/1997 | Chejlava, Jr. et al. | 395/843 |
| 5,745,733 | 4/1998 | Robinson | 395/500 |

*Primary Examiner*—Thomas C. Lee
*Assistant Examiner*—Omar A. Omar
*Attorney, Agent, or Firm*—Marger Johnson & McCollom, P.C.

[57] ABSTRACT

A Local Register Network (LRN) includes multiple nodes connected together by a local register bus. The nodes each include logic circuitry, one or more configuration registers, a data path and a decoder. The local register bus is unidirectional and transfer data and addresses to each one of the nodes. The decoder in each node contains local memory maps for the node configuration registers. Each decoder determines whether an address on the local register bus maps to the associated configuration registers and whether the accessed configuration registers read data onto the local register bus or write data from the local register bus. If the address does not map to the node, the data path passes the data to the next node in the LRN network.

17 Claims, 7 Drawing Sheets

METHOD AND APPARATUS FOR DISTRIBUTING AND ACCESSING CONFIGURATION REGISTERS

BACKGROUND OF THE INVENTION

This invention relates to using configuration registers in an integrated circuit and more particularly to providing a Local Register Network that reads and writes to a distributed configuration register architecture.

Application specific integrated circuits (ASICs) typically have multiple logic circuits arranged into functional blocks. The functional blocks are located in different places on the integrated circuit substrate. Each functional block may include one of more configuration registers that retain status information and control the operations preformed in the logic circuit.

The configuration registers are typically programmed at ASIC start-up by a central processing unit (CPU) through a primary bus having data and address lines. The CPU loads the configuration registers with configuration data according to the functions that the CPU wants the ASIC to perform. The CPU later reads some or all of the configuration registers for specified functional blocks to determine the operational status of the ASIC.

The ASIC typically includes a central decoder that decodes each configuration register address sent by the CPU. The central decoder maps the address to one of the configuration registers located in a centrally located register block. The enabled register is either loaded with data from the data lines in the primary bus or outputs currently stored status information onto the data lines. All configuration registers and the configuration register decoder are located in the same central location on the ASIC.

The logic circuits associated with the different configuration registers are spread out over the entire ASIC. There are usually numerous configuration registers connected to each distributed functional block. A substantial amount of area on the ASIC die is used for routing the data and control lines to each configuration register. Data traffic to and from configuration registers is generally less time critical and utilizes less bandwidth than the data traffic between the logic circuits and main memory. However, a large portion of the interconnections on the ASIC are used for passing information to and from the configuration registers.

The configuration register interconnections substantially increase the complexity of routing ASIC circuits and utilizes a large portion of the area on the ASIC die. This impacts die size along with the time required to design a routing layout for interconnections in the ASIC. Thus, the cost and time to get the ASIC to market is substantially increased.

Since one central decoder is used to enable all configuration registers in the ASIC, the decoder circuitry is complex. As more configuration registers are used in the ASIC, the complexity of the decoder circuitry substantially increases, further increasing the routing resources and routing time required to interconnect the distributed logic blocks to the configuration register circuitry.

Accordingly, a need exists for reducing the complexity of circuitry and the number of interconnections needed to control configuration registers.

SUMMARY OF THE INVENTION

A Local Register Network (LRN) communicates to configuration registers in a semiconductor device using substantially fewer interconnections than current architectures. The LRN uses a unidirectional bus connected to multiple distributed LRN nodes on the semiconductor device. The nodes each include configuration registers, a decoder that contains a local memory map for the configuration registers, and a data path that controls data through the LRN movement. Since addresses are only decoded for the configuration registers associated with each functional block, simple decoder circuits can be used. The unidirectional bus architecture of the LRN eliminates complex circuitry, such as arbiters, required to control standard bidirectional bus architectures.

For a write operation, data and an address are placed on the LRN bus. The address is read by all local decoders until one of the decoders in the LRN determines that the address is associated with a local configuration register. Data on the LRN bus is passed through the data paths in the LRN nodes until the addressed configuration register is reached. The local decoder accordingly loads the addressed configuration register with the data on the LRN bus.

For a read operation, an address is placed on the LRN bus. One of the local decoders connected to the addressed configuration register, load the contents of configuration register onto the LRN bus. The configuration register data is then passed through following subsequent nodes on the LRN bus until reaching a LRN control block.

Each decoder includes DATA_IN lines and DATA_OUT lines. The DATA_OUT lines for one node serve as the DATA_IN lines for the next node on the LRN. In a default mode, the DATA_IN lines and DATA_OUT lines for each functional block are connected together through a multiplexer (MUX). Thus, when no configuration register in a node maps to the address on the LRN bus, data on the LRN bus is simply passed through the data path to the next node.

The number of lines in the LRN bus is reduced by circuitry that multiplexes the data with the address. The number of LRN interconnections are further reduced by using a serial LRN bus that converts the data and address into a serial bit stream sent to each LRN node. Local interconnects are used to couple configuration registers with associated logic circuitry. Thus, the number of global interconnections in the ASIC are significantly reduced.

The foregoing and other objects, features and advantages of the invention will become more readily apparent from the following detailed description of a preferred embodiment of the invention which proceeds with reference to the accompanying drawings.

DETAILED DESCRIPTION

Figure 1:
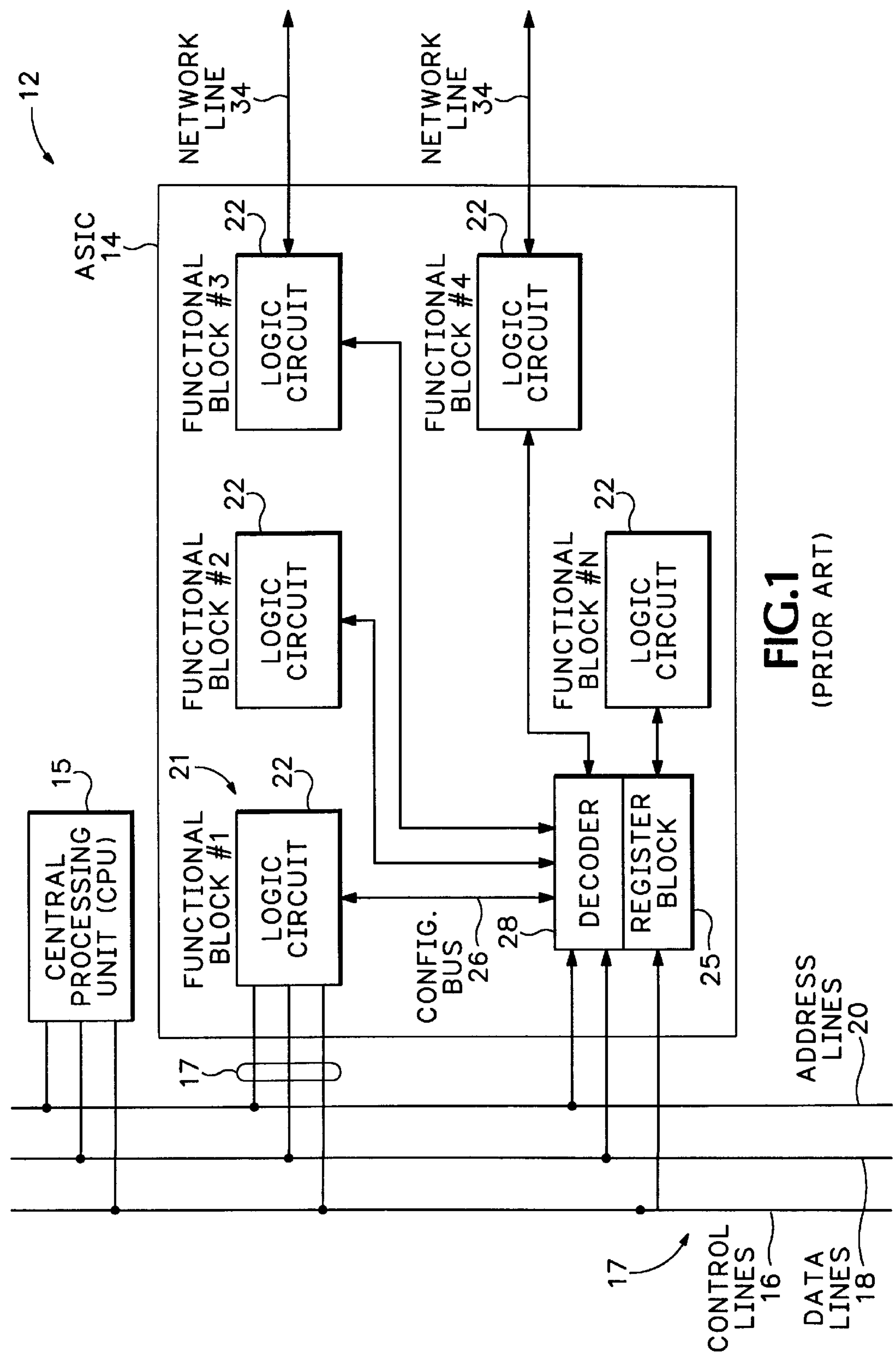
FIG. 1 is a prior art circuit diagram for an application specific integrated circuit having distributed configuration registers.

FIG. 1 is a circuit diagram of a prior art computer system 12. A central processing unit (CPU) 15 is coupled to a bus

17. The bus 17 includes control lines 16, data lines 18 and address lines 20. The CPU 15 is a general purpose processor that controls other processing elements in the computer system 12. The other processing elements might include an Application Specific Integrated Circuit (ASIC) 14 designed to preform dedicated tasks at higher speeds than the general purpose CPU 15. In one example, the ASIC 14 comprises circuitry for routing and switching network packets on external network lines 34.

The CPU 15 configures the ASIC 14 to perform in different ways for a particular connectivity and according to the required tasks. For example, the CPU 15 would configure the ASIC 14 differently according to the number of active network lines 34 connected to the ASIC 14 and according to the specific network protocols used for routing packets on the network lines 34. The CPU 15 also controls the ASIC 14 during routing and switching operations. For example, the CPU identifies locations in a main memory (not shown) where network packets are temporarily stored and identifies what network lines should be used to route the network packets.

The ASIC 14 is typically laid out on a substrate in multiple functional blocks 21 including logic circuitry that each perform different tasks. For example, the functional blocks 21 could include serial interface circuitry, a direct memory access controller (DMAC) or memory. Control and status information for the logic circuitry in each functional block 21 is determined through a set of configuration registers in register block 25.

A decoder 28 accesses the registers in register block 25 according to address lines 20. The register block 25 is coupled to circuitry in the associated functional blocks 21 through multiple global interconnects referred to generally as configuration bus 26. The decoder 28 and register block 25 are located in a central location on the ASIC 14. For simplicity, only functional block #1 is shown coupled directly to bus 17. One or more functional blocks 21 can have a data path coupled directly to bus 17 that is independent of the configuration bus 26.

The ASIC 14 represents any circuit that uses registers to control or retain status of logic circuitry. The CPU 15, bus 17 and ASIC 14 could be fabricated on the same integrated circuit chip. In another embodiment, the entire computer system 12 is contained on one or more printed circuit boards and each functional block 21 comprises an ASIC or a combination of integrated circuit chips.

The CPU 15 writes data into registers in register block 25 by placing an address and data value on bus 17. The central decoder 28 includes a memory map that identifies the address with one of the registers in register block 25. The decoder 28 activates the configuration registers in register block 25 mapping to the decoded address on bus 17. The enabled register then loads the data value placed on the data lines 18 by the CPU 15. To read a value from one of the registers in register block 25, the CPU 15 places the register address on bus 17. The central decoder 28 again decodes the address and enables the appropriate register. The value in the enabled register is placed on the data lines 18.

Configuration registers in register block 25 control and retain status information for associated logic circuitry in functional blocks 21 through interconnections in configuration bus 26. Since, the configuration block 25 can include hundreds of registers, thousands of global interconnections must be spread out over the entire ASIC.

Figure 2:
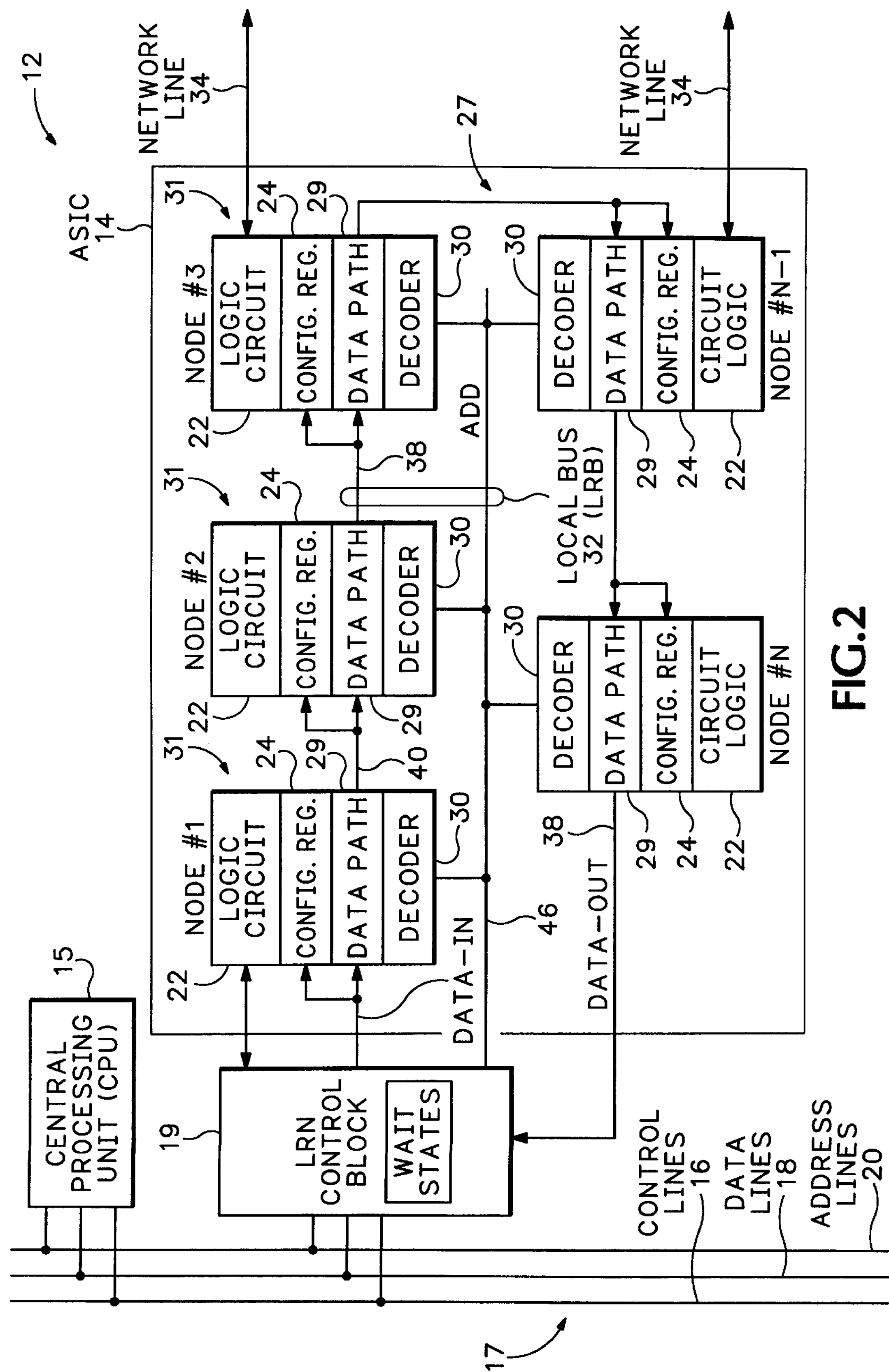
FIG. 2 is a circuit diagram of a Local Register Network according to the invention.

FIG. 2 is a circuit diagram of a Local Register Network (LRN) 27 that includes multiple nodes 31 coupled together through a local register bus 32 according to the invention. Each node 31 comprises logic circuitry 22, configuration registers 24, a data path 29 and a decoder 30. The local register bus includes unidirectional data lines 40 coupled in series with each node 31 and address lines 46 coupled in parallel with each node 31. Configuration registers 24 are defined as any register used to either control or retain status information for the associated logic circuitry 22.

Instead of locating and controlling the configuration registers 24 at one central location and then routing the configuration register interconnects globally over the entire chip, the configuration registers 24 are located locally in each node 31.

Each decoder 30 selectively enables the configuration register(s) 24 in the same node 31 for reading or writing data on the data lines in the local register bus 32. Data path 29 in each node 31 controls the flow of data through the node. The LRN 27 provides the same functionality as current configuration register circuitry but uses far fewer interconnections.

The local register bus 32 is coupled to the primary bus 17 through a LRN control block 19. The number of data lines in the local register bus 32 vary according to the number of bits in the configuration registers 24. The number of address lines in the local register bus 32 vary according to the number of configuration registers 24 in the ASIC 14. As described below, address and data signals can be multiplexed over common lines to further reduce the number of interconnects in the local register bus 32.

For a write operation, a register address, a data value, and control signals, are sent from bus 17 through LRN control block 19 onto local register bus 32. The data is loaded into the configuration register mapping to the address on bus 32. If a node 31 does not have the addressed register, the data is passed through to the next node. For read operations, an address value is input to the LRN control block 19 but no data is input. The configuration register, mapping to the register address on bus 32, outputs data through the data path 29 onto data lines 40. The data paths 29 in subsequent nodes 31 in the LRN 27 pass the data to the LRN control block 19. The data lines in the local register bus 32 are unidirectional for both reading data from the configuration registers 24 and writing data to the configuration registers 24. Thus, simple read and write circuitry is used to operate the LRN 27.

Figure 3:
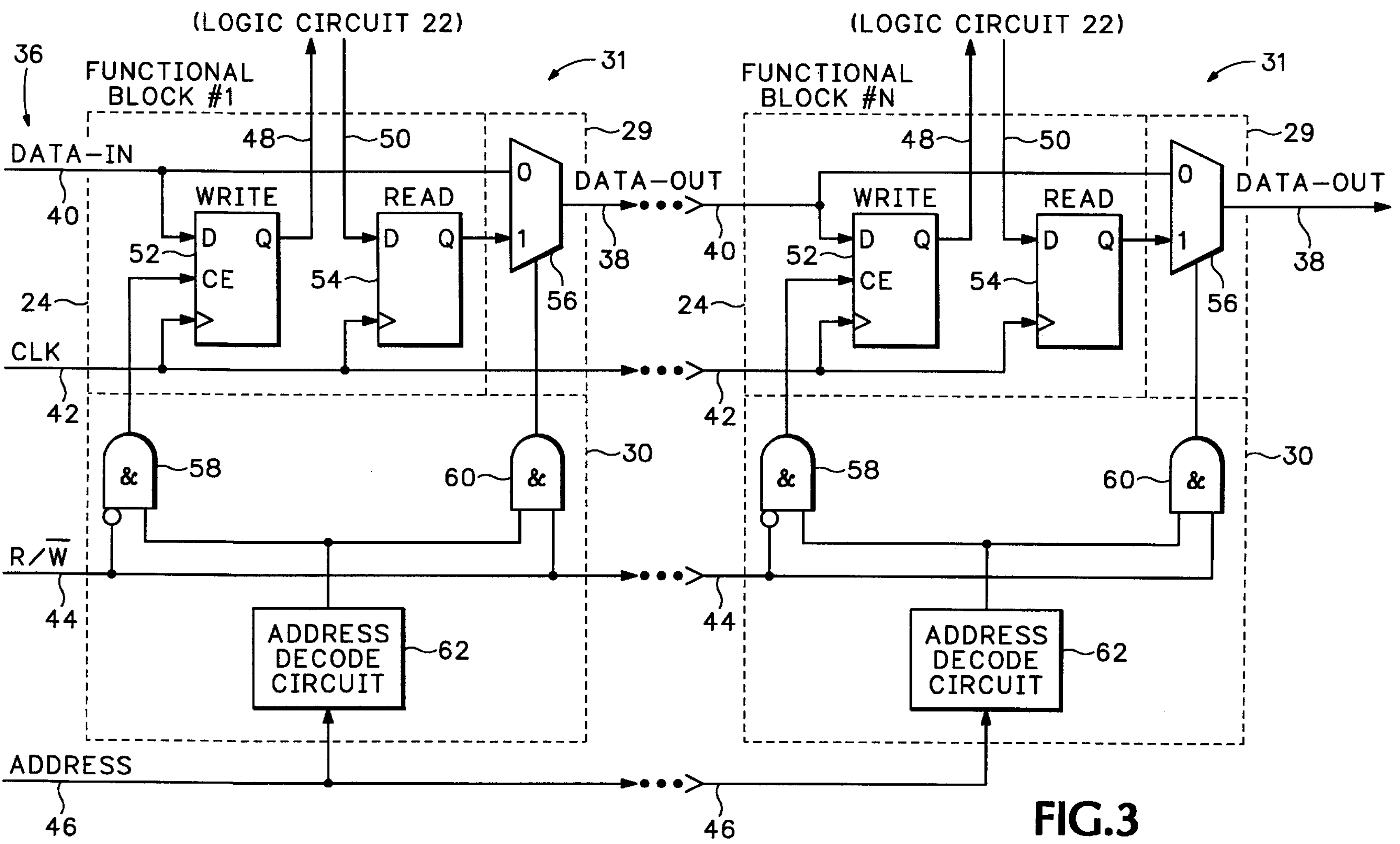
FIG. 3 is a detailed diagram of nodes used in the Local Register Network in FIG. 2.

Referring to FIG. 3, the configuration registers 24 comprise one or more pairs of flip-flops 52 and 54. Flip-flop 52 stores a data value written into the configuration register from DATA_IN lines 40. Flip-flop 54 reads a configuration register value onto DATA_OUT line 38. Line 48 connects the output of write flip-flop 52 to the logic circuit 22 (FIG. 2) and line 50 connects the data input of read flip-flop 54 to the logic circuit 22.

For clarity, the configuration register 24 is shown comprising only flip-flops 52 and 54. However, it should be understood the number of flip-flops used in the logic block varies according to the number of configuration registers in the node 31 and the number of bits in each configuration register (See FIG. 4). Typically the flip-flop used for writing data from DATA_IN lines 40 is different than the flip-flop used for reading data onto DATA_OUT lines 38. However, it is clear that the invention can be modified by one with average skill in the art to operate with a single read and write flip-flop.

Each decoder 30 includes an address decode circuit 62 having an input coupled to the address lines 46. The output of address decode circuit 62 is activated for one unique address on address lines 46 mapped to flip-flops 52 and 54.

The address decode circuit 62 uses standard memory map decode logic known to one skilled in the art and is, therefore, not described in detail.

A first AND gate 58 has a first input coupled to a read/write control line 44, a second input coupled to the output of the address decode circuit 62 and an output coupled to a chip enable on write flip-flop 52. A second AND gate 60 has a first input coupled to the read/write control line 44, a second input coupled to the output of address decode circuit 62 and an output coupled to a multiplexer (mux) 56. The mux is alternatively defined as the data path 29.

The mux 56 has a first data input coupled to the DATA_IN lines 40 and a second data input coupled to an output of the read flip-flop 54. An output of mux 56 comprises DATA_OUT lines 38 which are coupled to the next node 31 in the LRN 27. If the mux 56, in the last node 31 in the LRN 27, is coupled to the LRN control block 19. If there is a preceding node 31 in the LRN 27, the DATA_IN lines 40 comprise an output from the preceding node's mux 56. If the decoder 30 is the first node 31 in the LRN 27, the DATA_IN lines 40 are coupled to the LRN control block 19 (FIG. 2).

The LRN 27 can support any number of nodes 31. If the accumulated delay through the nodes 31 near or exceeds the bus clock cycle, then one or more wait states are included in LRN control block 19 timing circuitry. Multiple independent LRN loops can be connected to the LRN control block 19. Each LRN loop transfers configuration register control and status information for different sets of associated nodes 31. Multiple LRNs 27 reduce overall loading and propagation delays on each individual LRN 27. Each loop operates in a manner similar to the LRN 27 in FIGS. 2 and 3.

The data lines 40 in the local register bus 32 are coupled in series between the multiple nodes 31. The address lines in the local register bus 32 are coupled in parallel to the multiple nodes 31. Each data path 29 has a default condition where the data on the DATA_IN lines 40 is automatically passed through mux 56 to the DATA_OUT lines 38. The default condition is varied by the address on address lines 46. Unless the address on address lines 46 map to the configuration registers 24 in a node 31, the data path 29 remains in the default condition.

For a read operation, the address decode circuit 62 determines whether the address on address lines 46 is mapped to flip-flop 54. If the address maps to flip-flop 54, the address decode circuit 62 activates AND gate 60, in turn, driving the control input of mux 56 high. The output of read flip-flop 54 is then output onto the DATA_OUT lines 38. The value of read flip-flop 54 then passes through the data paths 29 of following nodes 31, in any, to the LRN control block 19 (FIG. 2).

For a write operation, the data and address for the target configuration register is sent to the LRN control block 19 from bus 17. A data value from LRN control block 19 is serially passed through the data path 29 in each node 31 until reaching the target node 31. In other words, the data path 29 in each node 31 remains in the default transparent condition. The address decode circuit 62 connected to the target flip-flop enables AND gate 58, in turn, activating the chip enable line of the write flip-flop 52. The data value on DATA_IN lines 40 is then written into the write flip-flop 52.

According to the clock frequency and the time delay through each node 31, a time delay is calculated for passing data through the LRN 27. Wait states are added, if necessary, to the LRN control block 19. Accordingly, the LRN control block 19 waits the predetermined number of wait states after placing an address on the local register bus 32 before reading data from the LRN bus 32. The wait states allow the LRN 27 to operate at faster clock speeds.

Figure 4:
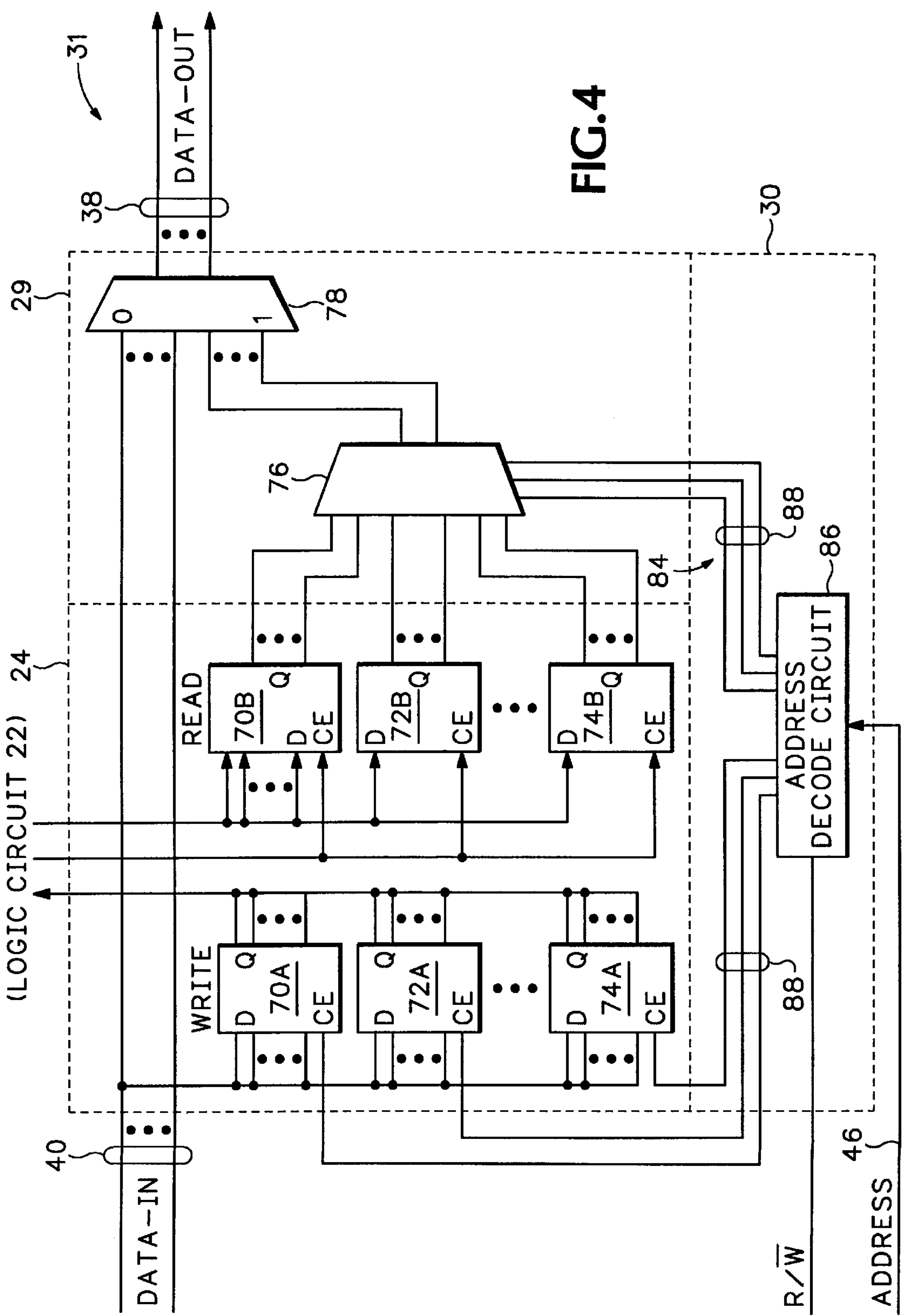
FIG. 4 is an alternative embodiment of the nodes used in the Local Register Network in FIG. 2 with a full multi-bit data path.

FIG. 4 shows another embodiment of the invention with multiple configuration registers located in one or more nodes 31. Multiple write configuration registers 70A, 72A and 74A each have data inputs coupled to DATA_IN lines 40 and data outputs coupled to logic circuit 22. Multiple read registers 70B, 72B and 74B have data inputs coupled to the logic circuit 22. Data path 29 includes a mux 76 coupled to the outputs of read registers 70B, 72B and 74B and a mux 78 coupled at the inputs to the output of mux 76 and DATA_IN lines 40 and coupled at the output to the DATA_OUT lines 38.

An address decode circuit 86 activates one of control lines 88 when the address on address lines 46 maps to one of the configuration registers 70, 72 or 74. For a write operation to register 72A, the control line 88 coupled to the chip enable of register 72A is activated by address decoder circuit 86. The data on DATA_IN lines 40 is then loaded into the write register 72A.

In a manner similar to FIG. 3, the mux 78 in data path 29 normally operates in a transparent default mode where the data on DATA_IN lines 40 is normally passed through to the DATA_OUT lines 38. However, during a read operation, say to register 70B, the output of register 70B is passed through mux 76 and mux 78 onto the DATA_OUT lines 38.

Figure 5:
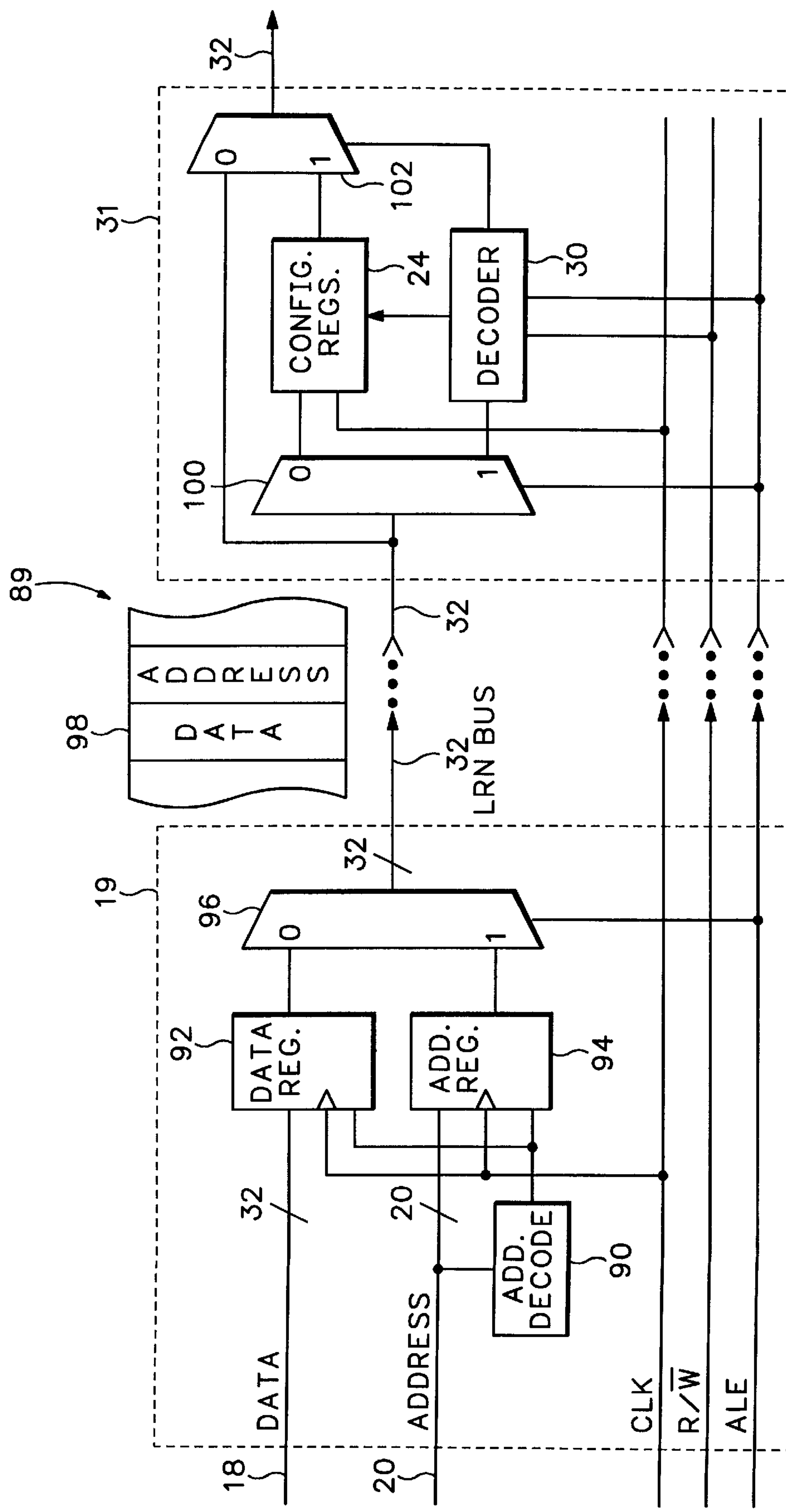
FIG. 5 is a circuit diagram showing a parallel multiplexed Local Register Network.

FIG. 5 shows circuitry for a parallel muxed LRN 89. In order to reduce the number of lines used in the LRN bus 32, the address and data is multiplexed together. The LRN control block 19 includes a data register 92 coupled to the data lines 18 from bus 17 and an address register 94 coupled to the address lines 20 from bus 17. An address decoder 90 decodes the address on lines 20. If the address maps to the LRN 89, registers 92 and 94 are enabled. A mux 96 multiplexes the data and address from registers 92 and 94 onto the same lines in local register bus 32 according to an Address Latch Enable (ALE) control signal.

The multiplexed address and data 98 is passed through a mux 102 in each node 31 until reaching a target node 31 having the configuration register associated with the address. A mux 100 in the node 31 demultiplexes the parallel multiplexed address and data 98 according to the signal on the ALE line. The demultiplexed parallel data is directed to configuration registers 24 and the demultiplexed parallel address is directed to decoder 30.

The configuration registers 24 and decoder 30 are similar to those shown in FIGS. 3 and 4. For a write operation, the data from LRN bus 32 is written into the configuration register 24 enabled by decoder 30. For a read operation, the data from the register enabled by decoder 30 is multiplexed by mux 102 onto local register bus 32.

Figure 6A:
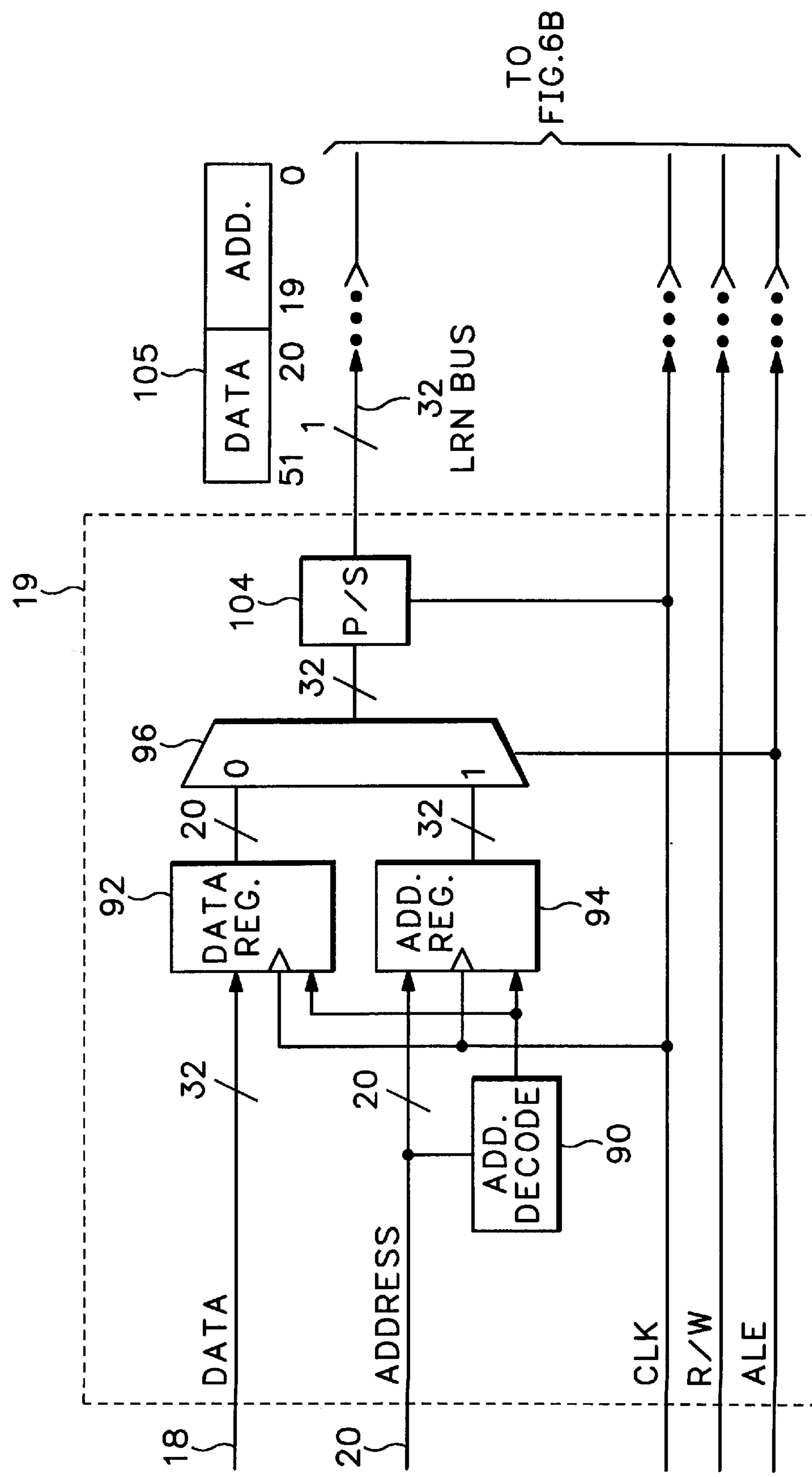
FIG. 6 is a circuit diagram showing a serial Local Register Network.
Figure 6B:
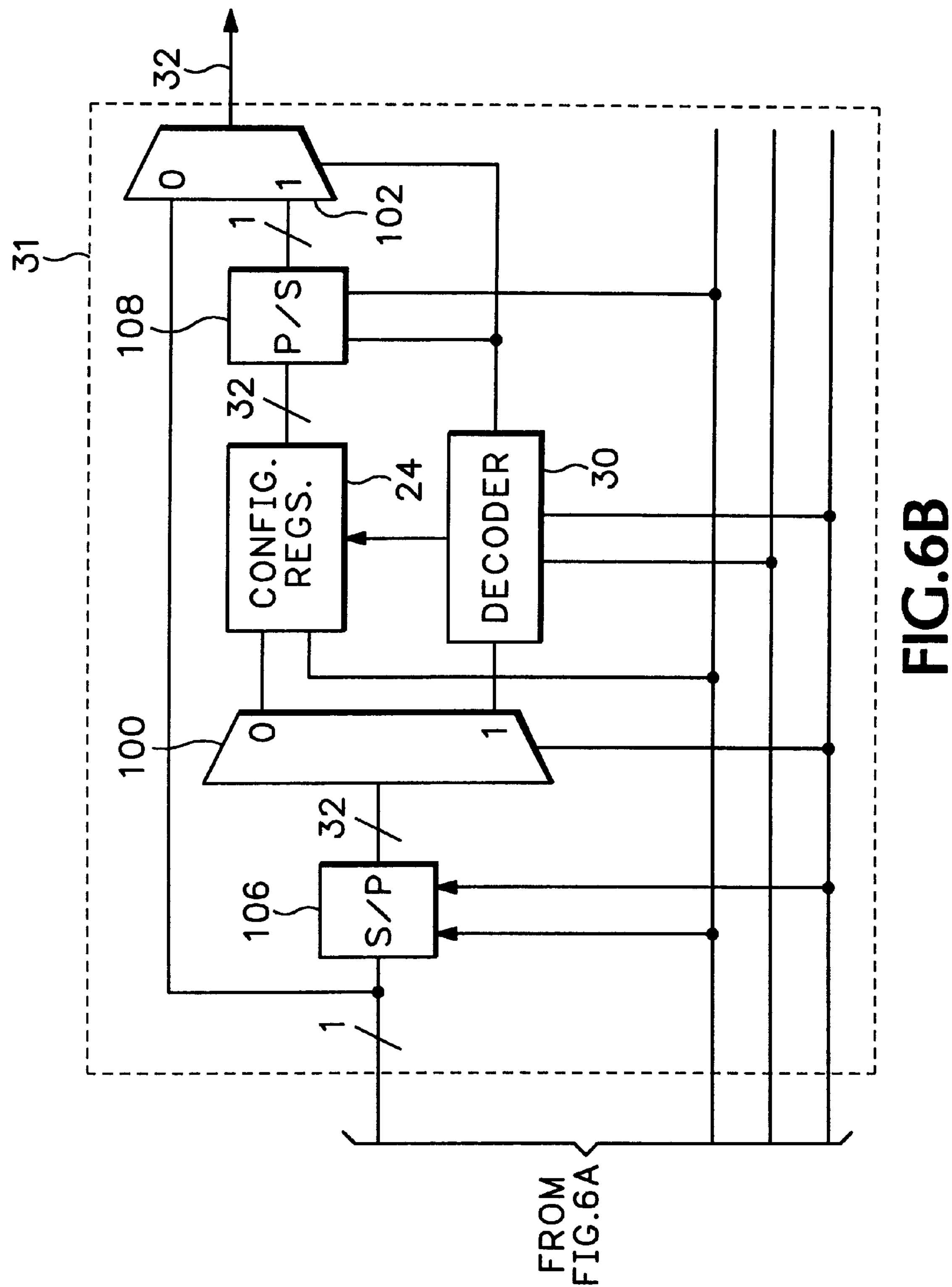

Referring to FIG. 6, the number of interconnects is further reduced by transporting the data and address in the LRN 27 over a serial LRN bus 32. A parallel to serial converter 104 is coupled to the output of the mux 96. Parallel to serial converters are commercially available and known to those skilled in the art. The mux 96 alternates outputting data from data register 92 and outputting addresses from address register 94 according to the value on the ALE control line. The parallel to serial converter 104 converts the data and address into a serial bit stream 105 sent over a single line in the LRN bus 32. The LRN bus 32 is coupled to each node 31 in the LRN 27.

The serial bit stream 105 is converted at each node 31 back into parallel information by a serial to parallel converter 106. The ALE control line is used by the converter 106 to identify when a new frame of address and associated data signals arrive on the LRN bus 32. The mux 100 couples the now parallel address to the decoder 30 and the parallel data to configuration registers 24 are previously described in FIG. 5.

When data is read from the configuration register 24, the decoder 30 enables a parallel to serial converter 108 that converts the output from the addressed configuration register 24 back into a serial bit stream. The decoder 30 then directs the mux 102 to output the serial data onto serial LRN bus 32. If the address received by decoder 30 does not map to one of the configuration registers 24, the parallel bit stream 105 is passed through mux 102 to the next node 31.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for controlling configuration registers located in different nodes in a semiconductor device, comprising:

providing a local register bus coupled to each one of the configuration registers;

sending an address associated with one of the configuration registers on the local register bus;

decoding the address on the local register bus in parallel at each configuration register location;

enabling one of the configuration registers associated with the decoded address; and placing an address on the local register bus and reading data loaded onto the local register bus by one of the configuration registers after a predetermined number of wait states.

2. A method for controlling configuration registers located in different nodes in a semiconductor device, comprising:

providing a local register bus coupled to each one of the configuration registers;

sending an address associated with one of the configuration registers on the local register bus;

decoding the address on the local register bus in parallel at each configuration register location;

enabling one of the configuration registers associated with the decoded address;

multiplexing the address with the data;

passing the multiplexed address and data through each node on the local register bus;

demultiplexing the address and data at each node;

decoding the demultiplexed address; and enabling the configuration register in the node mapped to the decoded address.

3. A computer system, comprising:

a primary bus;

a central processing unit coupled to the primary bus;

multiple distributed nodes each including a logic circuit and a configuration register coupled to the logic circuit, each configuration register controlling or retaining status for the coupled-associated logic circuit; and a local register bus coupled between the nodes, the local register bus including local register bus address lines for transferring an address from the central processing unit to each one of the nodes and the local register bus including local register bus data lines for transferring data between the central processing unit and an addressed one of the configuration registers, wherein the nodes each further include the following:

an address decode circuit coupled to the local register bus address lines;

a first logic gate having a first input coupled to local register bus control lines, a second input coupled to the address decode circuit and an output enabling a write operation to the configuration register;

a second logic gate having a first input coupled to one of the control lines, a second input coupled to the address decode circuit and an output; and a multiplexer having a first data input coupled to a data line output from a preceding one of the nodes, a second data input coupled to a data output from the configuration register, a control input coupled to the output of the second logic gate and a data output coupled to a following one of the nodes on the local register bus.

4. A Local Register Network for a semiconductor device, comprising:

a local register bus including a local register address bus and a bit-serial data path; and multiple nodes configured in the form of a loop whereby data are passed sequentially from one node to another around the loop, the nodes each including one or more configuration registers associated with logic circuitry in the semiconductor device, the nodes each further including one or more local decoders coupled to the local register bus and to an associated one or more of the configuration registers, the decoders each selectively enabling the associated configuration registers for reading or writing data on the bit-serial data path according to an address on the local register address bus.

5. A Local Register Network according to claim 4 wherein the nodes each include a data path coupled in series with the local register bus data lines.

6. A Local Register Network according to claim 2 wherein the data path includes a multiplexer having a default condition that passes data on the data lines to a following one of the nodes on the local register bus and an active condition that places a value in one of the configuration registers on the data lines.

7. A Local Register Network according to claim 2 wherein the decoder is coupled in parallel with the local register bus address lines.

8. A Local Register Network according to claim 4 wherein the decoders each include a logic circuit coupled to one of the control lines for controlling read and write operations in the associated configuration registers.

9. A Local Register Network according to claim 8 wherein the decoders each further include an address decode circuit coupled between the address lines and the logic circuit.

10. A Local Register Network according to claim 4 wherein the configuration registers each include at least one write flip-flop and/or at least one read flip-flop.

11. A Local Register Network according to claim 7 wherein the decoders include the following:

an address decode circuit having an input coupled to the address lines;

a first logic gate having a first input coupled to one of the control lines, a second input coupled to the address decode circuit and an output enabling the write flip-flop; and a second logic gate having a first input coupled to one of the control lines, a second input coupled to the address decode circuit and an output enabling the read flip-flop.

12. A Local Register Network according to claim 7 wherein an output of the write flip-flop is coupled to the logic circuitry in the same node and a data input on the read flip-flop is coupled to the logic circuitry in the same node.

13. A Local Register Network according to claim 1 including a local register network control block coupled between a primary bus and the local register bus, the control block imposing predetermined wait states for reading data from the local register bus.

14. A Local Register Network according to claim 4 wherein the nodes each include a multiplexing circuit for multiplexing and demultiplexing the address with the data on the local register bus.

15. A Local Register Network according to claim 2 wherein the nodes each include a parallel to serial converter coupled between the local register bus and the configuration registers and the decoder and a serial to parallel converter coupled between the configuration registers and the data path.

16. The Local Register Network of claim 4 for interconnection with a primary bus having a primary address bus and a parallel data bus, the Local Register Network further comprising a serial/parallel converter coupled between the local register bus and the primary bus for converting data from parallel to bit serial and for converting data from bit serial to parallel.

17. The Local Register Network of claim 16, wherein said bit-serial data path is unidirectional around the loop.

* * * * *